(12) United States Patent
Brett

(10) Patent No.: US 6,247,533 B1
(45) Date of Patent: Jun. 19, 2001

(54) UTILIZATION OF ENERGY FROM FLOWING FLUIDS

(75) Inventor: James Ford Brett, Tulsa, OK (US)

(73) Assignee: Seismic Recovery, LLC, Tulsa, OK (US)

(*) Notice: Subject to any disclaimer, the term of this patent is extended or adjusted under 35 U.S.C. 154(b) by 0 days.

(21) Appl. No.: 09/563,281

(22) Filed: May 3, 2000

Related U.S. Application Data

(63) Continuation-in-part of application No. 09/037,307, filed on Mar. 9, 1998, now Pat. No. 6,059,031.

(51) Int. Cl.[7] .................................................. E21B 43/25
(52) U.S. Cl. ................... 166/65.1; 166/104; 166/177.6; 166/188; 166/249
(58) Field of Search .................................. 166/65.1, 104, 166/177.2, 177.6, 188, 249, 369, 370, 386, 387; 181/106, 107; 367/36, 37

(56) References Cited

U.S. PATENT DOCUMENTS

| | | |
|---|---|---|
| 1,892,217 | 12/1932 | Moineau . |
| 2,085,115 | 6/1937 | Moineau ................................ 74/466 |
| 2,447,827 | 8/1948 | Turechek . |
| 2,483,370 | 9/1949 | Moineau .................................. 103/4 |
| 2,651,370 | 9/1953 | Pearson ............................ 166/104 X |
| 2,730,176 | 1/1956 | Herbold ............................. 166/177.6 |
| 2,894,724 | 7/1959 | Andrew .................................. 255/27 |
| 3,405,770 | 10/1968 | Galle et al. ............................. 175/56 |
| 3,520,362 | 7/1970 | Galle .................................... 166/249 |
| 3,743,017 | 7/1973 | Fast et al. ............................. 166/249 |
| 3,754,598 | 8/1973 | Holloway, Jr. ....................... 166/249 |
| 3,923,099 | 12/1975 | Brandon ................................ 166/249 |
| 4,001,773 | * 1/1977 | Lamel et al. ............................ 175/40 |
| 4,015,662 | 4/1977 | Cochran ................................ 166/104 |
| 4,058,163 | 11/1977 | Yandell ................................. 166/177 |
| 4,121,895 | 10/1978 | Watson ................................. 417/104 |
| 4,342,364 | 8/1982 | Bodine ................................. 166/249 |
| 4,432,078 | * 2/1984 | Silverman ........................ 166/249 X |
| 4,449,892 | 5/1984 | Bentley ................................ 417/240 |
| 4,469,175 | 9/1984 | Massa .................................. 166/249 |
| 4,614,232 | 9/1986 | Jurgens et al. ..................... 166/105.5 |
| 4,624,306 | 11/1986 | Traver et al. ......................... 166/104 |
| 4,702,315 | 10/1987 | Bodine ................................. 166/249 |
| 4,775,016 | 10/1988 | Barnard ................................. 175/56 |
| 4,817,712 | 4/1989 | Bodine ................................. 166/249 |
| 4,923,376 | 5/1990 | Wright .................................... 418/48 |
| 5,135,051 | 8/1992 | Facteau et al. ....................... 166/104 |
| 5,147,535 | 9/1992 | Bernhardt .......................... 166/177.6 |
| 5,159,160 | 10/1992 | Brett .................................... 181/106 |
| 5,282,508 | 2/1994 | Ellingsen et al. .................... 166/249 |
| 5,309,405 | 5/1994 | Brett et al. ............................. 367/36 |
| 5,319,610 | * 6/1994 | Airhart ................................. 181/106 |
| 5,323,855 | 6/1994 | Evans .................................. 166/248 |
| 5,417,281 | 5/1995 | Wood et al. ............................ 166/68 |
| 5,515,918 | 5/1996 | Brett et al. ............................ 166/249 |
| 5,582,247 | 12/1996 | Brett et al. ............................ 166/249 |
| 5,839,508 | * 11/1998 | Tubel et al. ......................... 166/65.1 |
| 6,094,401 | * 7/2000 | Masak et al. .................... 181/106 X |

* cited by examiner

*Primary Examiner*—George Suchfield
(74) *Attorney, Agent, or Firm*—Head, Johnson & Kachigian

(57) ABSTRACT

A fluid powered downhole vibration tool used in a well bore having fluids under pressure. The tool includes a resonant chamber with a through passage in communication with the fluids under pressure wherein the chamber vibrates as the fluids pass through the passage. The resonant chamber is coupled to the well bore, causing vibration of the bore as the chamber vibrates.

8 Claims, 5 Drawing Sheets

UTILIZATION OF ENERGY FROM FLOWING FLUIDS

CROSS REFERENCE TO RELATED APPLICATION

This application is a continuation-in-part of U.S. patent application Ser. No. 09/037,307, filed Mar. 9, 1998, now U.S. Pat. No. 6,059,031, hereby incorporated by reference.

BACKGROUND OF THE INVENTION

1. Field of the Invention

The present invention is related to a fluid powered downhole vibration tool which will be used in a subterranean well bore having fluids under pressure. In particular, the present invention is directed to a fluid powered downhole vibration tool powered by fluid flow from the formation itself in order to drive a seismic source.

2. Prior Art

The concept of generating a vibrational signal underground which is used for seismic purposes is known. The vibrational signal may be used for a variety of purposes, such as in gas wells where condensation has built up in the formation near the well bore and has been limiting production. Vibrational energy from a downhole seismic source would improve the mobility of the fluids trapped in the formation and, therefore, increase well productivity.

An underground vibrational signal can also be used to allow investigation of subterranean structures. The downhole vibrational signal is used as a seismic energy source for generating information as to geology surrounding the borehole.

The seismic signals radiate in the earth. Much information can be procured at the earth's surface or in adjacent boreholes as to the rate of travel and the reflection of seismic signals. Upon analysis of the receipt of the seismic signals, much can be learned about the structure of the earth surrounding the borehole and the structure of the earth in the area between the borehole and the point where the seismic signals are generated and the earth's surface or the adjacent well bore. Analysis of the received signals resulting from the seismic signals can be carried out at the site or remotely. The seismic source has many applications. For example, the seismic signal makes it possible to more effectively obtain critical seismic profiles of the earth surrounding a borehole. Improved crosswell tomography geophysical techniques can be practiced using the high energy vibrational source.

Many types of cementing and production enhancement techniques can be improved when combined with downhole vibrational energy sources. As an example, cementing and gravel packing can be improved with the use of downhole vibrational energy source.

The use of vibrational energy in a subterranean borehole is shown in Applicant's prior patents, such as U.S. Pat. No. 5,159,160; U.S. Pat. No. 5,309,405; U.S. Pat. No. 5,210,381; and U.S. Pat. No. 5,515,918, which spin a shaft to create rotational energy which is used to create vibrational energy in the borehole. Each of these is incorporated herein by reference. In Applicant's prior disclosures, however, an energy source from the surface is used, such as an electric, hydraulic or mechanical motor.

By having the well bore fluids power the vibrational source, cost could be reduced compared with having a power source at the surface.

Accordingly, it is a principal object and purpose of the present invention to provide a downhole vibrational tool which is primarily powered by produced fluids under pressure in the well bore.

Fluid powered motors are also known. Fluid powered motors accept fluid power and convert it into mechanical power output. Various types of fluid powered motors are known. For example, the motors known as Moineau motors. Examples are shown in Moineau (U.S. Pat. No. 2,085,115; 1,892,217 and 2,483,370). In these motors, at least a pair of helical members, disposed one within the other, includes an inner member having an exterior that is constantly in contact with an outer member. At least one of the gears is rotatable about the longitudinal axis. Other types of fluid powered motors include gear type motors, rotary vane motors and reciprocating motors.

It is a further object and purpose of the present invention to provide a downhole vibrational tool having a fluid powered motor which rotates a seismic source within the well bore.

It is an additional object and purpose of the present invention to provide a downhole vibrational tool for generating vibration in a well bore wherein the vibrational energy may be controlled and regulated.

It is an additional object and purpose of the present invention to provide a downhole vibrational tool having a fluid powered motor with at least a pair of helical members disposed one within the other, each rotatable about a longitudinal axis.

It is also known to utilize a fluid oscillator within a subterranean well bore. Examples include Galle et al. (U.S. Pat. No. 3,405,770), Bodine (U.S. Pat. No. 4,702,315), Fast et al. (U.S. Pat. No. 3,743,017) and Barnard (U.S. Pat. No. 4,775,016).

It would be desirable to power a fluid oscillator with the differential pressure of the fluid in the subterranean well bore. Accordingly, it is another object and purpose of the present invention to provide a downhole vibrational tool having a fluid oscillator within the well bore which engages the well bore to cause vibration of the well bore.

SUMMARY OF THE INVENTION

The present invention provides a downhole vibration tool as well as a system to utilize energy from flowing fluids in a well bore. Within a well bore is an elongated cylindrical mass having an external cylindrical surface. The cylindrical mass has a diameter less than the well bore and/or casing. The cylindrical mass would be rotated by a mechanism utilizing energy from fluids moving into the well bore from the subterranean formation because of the pressure differential. Fluid would flow from the subterranean reservoir into the well bore, up the well bore and toward the surface. A fluid powered motor is placed within the well bore so that the motor is in fluid communication with the flowing fluids. In one preferred embodiment of the invention, a Moineau-type motor is employed. A pair of helical members are disposed one within the other. Each helical member is rotatable about a longitudinal axis. The longitudinal axes are parallel to each other but are spaced from each other are not coincident. As fluid passes into and through the fluid motor, the inner helical member would be caused to rotate about its axis. Rotation of the inner helical member causes rotation of an actuator coupling. Rotation of the actuator coupling, in turn, causes rotation of the seismic cylindrical mass. Due to the frictional contact of the mass with the casing, the center of the mass will migrate or backward whirl in a direction opposite of the rotation provided by the motor. The whirling mass will contact each point on the casing at a known frequency rate to provide a vibration.

DETAILED DESCRIPTION OF THE PREFERRED EMBODIMENTS

Figure 2:
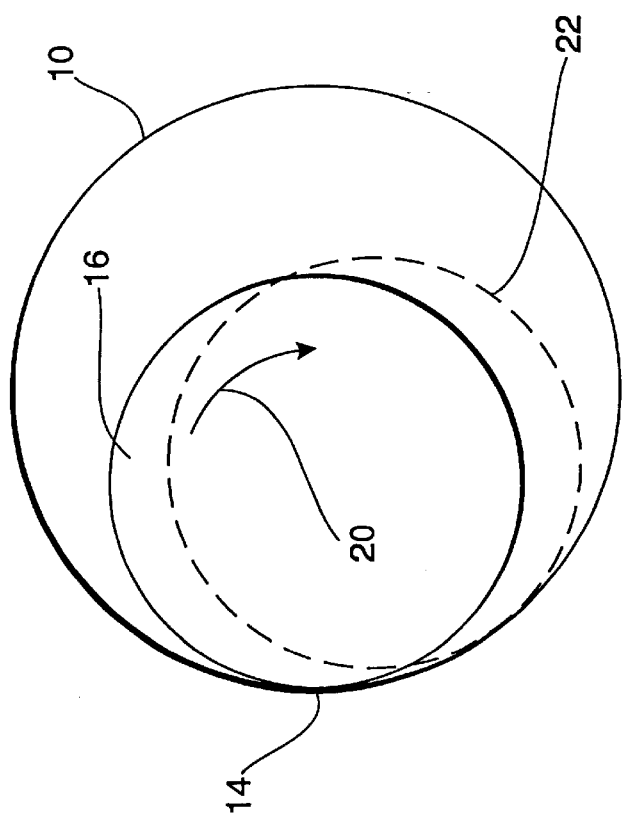
FIG. 2 is a cross sectional view taken along section line 2—2 of FIG. 1 showing the cylindrical mass in cross section and illustrating how the cylindrical mass whirls within the borehole to create centrifugal force.
Figure 1:
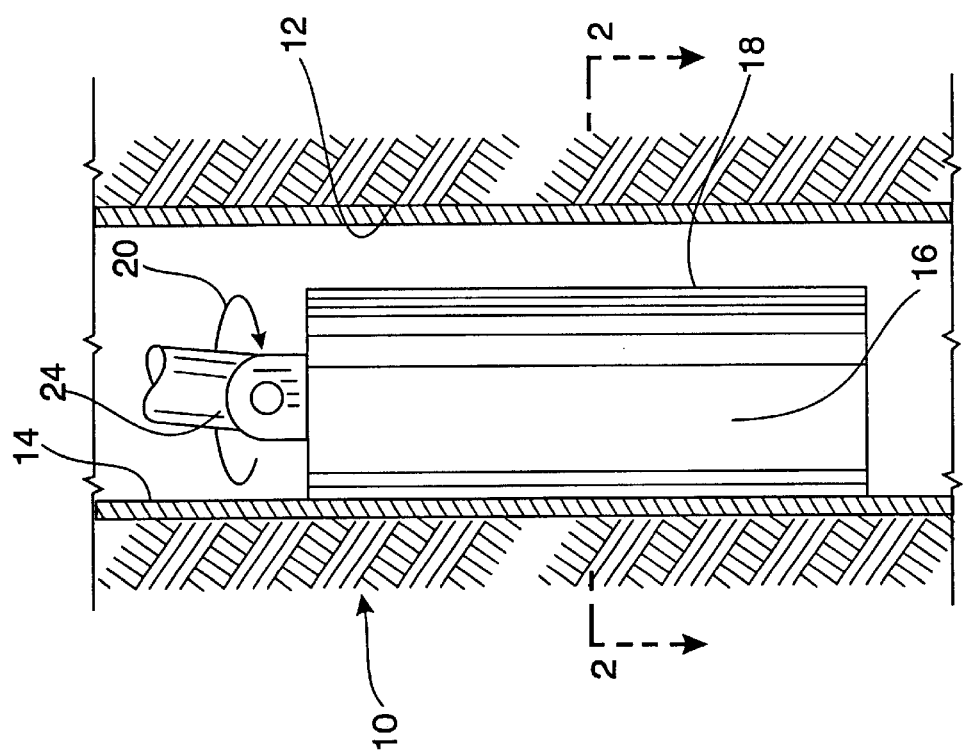
FIG. 1 illustrates a sectional view of a subterranean well bore with a cylindrical mass of the present invention as it is rotated in the borehole. The mass being in contact with the borehole or the well casing so that as it is rotated, the mass migrates in a direction opposite of rotation to create centrifugal force.
Figure 3:
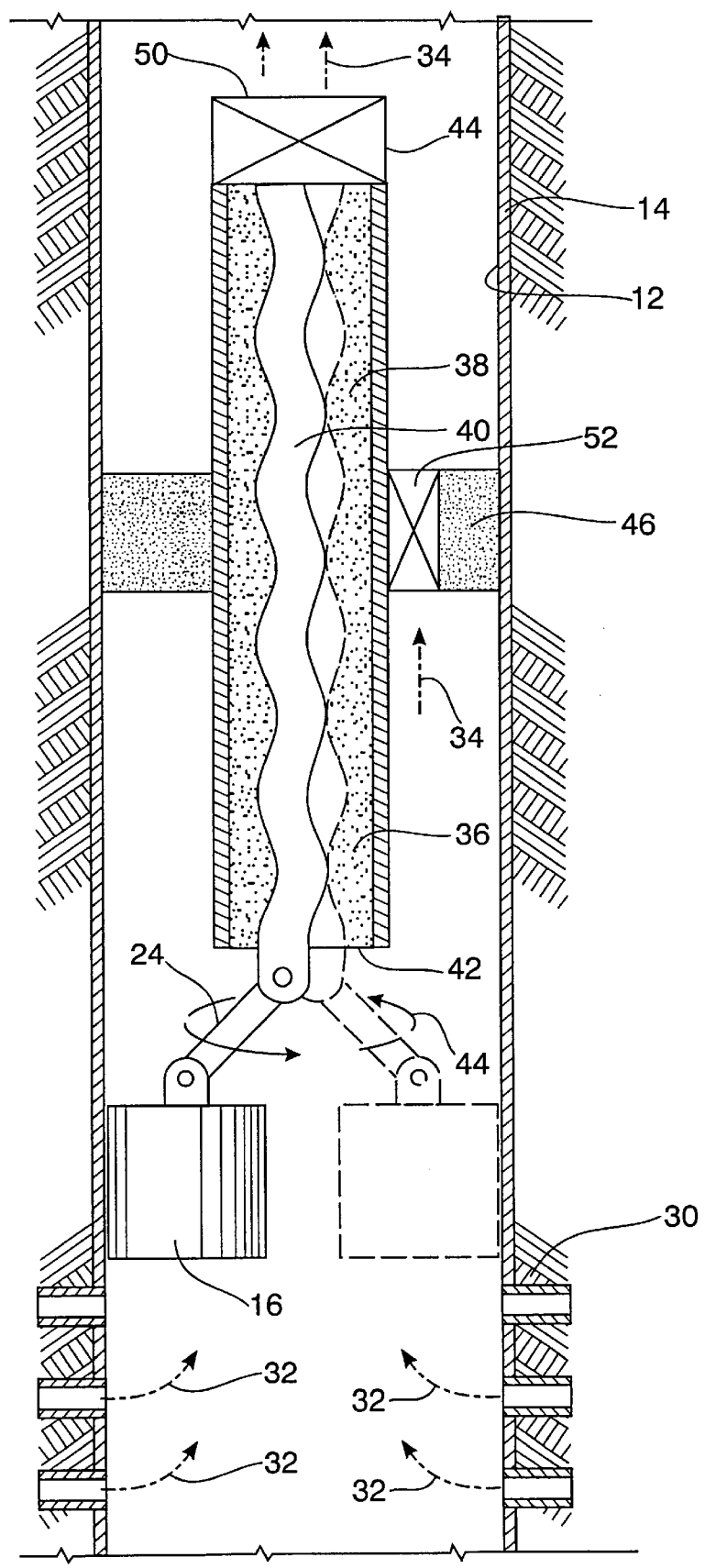
FIG. 3 is a diagrammatic view of a subterranean borehole showing one embodiment of the to present invention.

Referring to the drawings in detail, FIGS. 1, 2 and 3 illustrate one preferred embodiment 10 of the present invention which is directed to a downhole tool and a method of using energy from flowing fluids produced from a formation. Referring to FIG. 1, a borehole 12 extends downward from the earth's surface and may be drilled in a well known manner, such as for oil or gas wells. A portion of the borehole is shown in FIG. 1. The well bore may include a cylindrical casing 14. It will be understood that the present invention will work with or without the cylindrical casing. For example, a housing may be fixably attached to the well bore wall or casing.

Positioned within the cylindrical casing 14 is an elongated cylindrical mass 16 having an external cylindrical surface 18. The cylindrical mass 16 has a diameter less than the internal diameter of casing 14. The external surface 18 of the mass might have rough edges, ribs, gear teeth or other non-cylindrical features.

Power or energy is inherent in the flow of fluids from the subterranean formation into and through the well bore because of the pressure differential.

The mass 16 will be rotated by a mechanism utilizing energy from fluids moving into and through the well bore in a manner to be described herein so that the mass is rotated as shown in arrow 20. The cylindrical surface 18 of the mass will come into contact with the casing 14 of the borehole 12.

FIG. 2 is a cross-sectional diagrammatic view taken along section line 2—2 of FIG. 1. When the cylindrical mass 16 is rotated clockwise in the direction indicated by arrow 20, the seismic cylindrical mass, due to its frictional contact with the casing 14, will migrate or backward whirl in a counter-clockwise direction. That is, the center of the mass 16 will move in a direction opposite that off the rotation of the mass, creating centrifugal force. After an incremental period, the mass will take the position as indicated by 22. The seismic mass will continue to rotate in a counterclockwise direction, whirling about the interior of the borehole.

Returning to a consideration of FIG. 1, the mass 16 is in connection with and driven and rotated by an actuator coupling 24.

The whirling mass 16 will contact each point on the casing at a known frequency rate given the diameter of the mass, the diameter of the borehole and the revolutions per minute of the mass. Additionally, the contact force of the cylindrical mass 16 against each point of contact with the casing may be expressed according to a known formula.

Frictional enhancing surfaces may be added to the mass or a flexible elastomeric member may be added to the surface of the mass 16.

FIG. 3 illustrates one preferred embodiment of the present invention utilizing energy from flowing fluids produced from a formation. The well bore 12 is in fluid communication with a subterranean formation 30 which contains fluids, such as oil and gas. Because of differential pressure, fluid would flow from the subterranean reservoir into the well bore 12 and up the well bore toward the surface because of the differential pressure. This movement of fluid is illustrated by arrows 32 and 34. A fluid powered motor 36 would be placed within the well bore so that the fluid powered motor 36 is in fluid communication with the fluids under pressure. The fluid powered motor 36 is powered by flow from the formation itself In the embodiment shown in FIGS. 1, 2 and 3, a Moineau-type motor is employed. It will be understood that other types of fluid powered motors, such as turbines, reciprocating or other types of fluid motors might also be employed. In the embodiment shown, a pair of helical members 38 and 40 are disposed one within the other. Each member is rotatable about a longitudinal axis. The longitudinal axes are parallel to each other but are not coincident with each other. The inner member 40 has an outline such that every thread constantly engages the outer member 38. As fluid passes into and through the fluid motor, the inner member 40 will be caused to rotate about its axis. In particular, fluid would enter end 42 and thereafter exit from end 44 of the fluid powered motor 36. Fluid pressure passing through the motor would cause the inner member 40 to rotate. Rotation of the inner helical member 40 causes rotation of the actuator coupling 24. This rotation, in turn, causes rotation of the mass and the backward whirling of the mass 16 as illustrated by arrow 44.

The backward whirling mass is used as a source of vibrational energy.

The fluid powered motor 36 may be held within the well bore by packer element 46 to retain the motor in place. The packer element 46, which can create a seal, may either be a permanent installation or may be retrievable.

The fluid powered motor 36 may include a shut-off valve 50 or other valving device to shut off, restrict or control fluid flow through the fluid powered motor 36. When the shut-off valve 50 is closed, fluid will be prohibited from passing through the motor and the mass 16 will cease its rotation.

The downhole vibration tool 10 may also include a bypass shunt valve 52 (illustrated in diagrammatic form) which in the present embodiment is built into the packer element. A portion of the fluid flow from the formation could be diverted through the bypass mechanism. This bypass valve 52 could be active, therefore changing in response to the fluid flow in the well bore, or it could be passive, such as a choke or other similar device.

As an alternate to the configuration shown in FIGS. 1, 2 and 3, the fluid powered motor 36 might be used as an energy source to power a downhole electric powered shaking device.

Turbine

Figure 4:
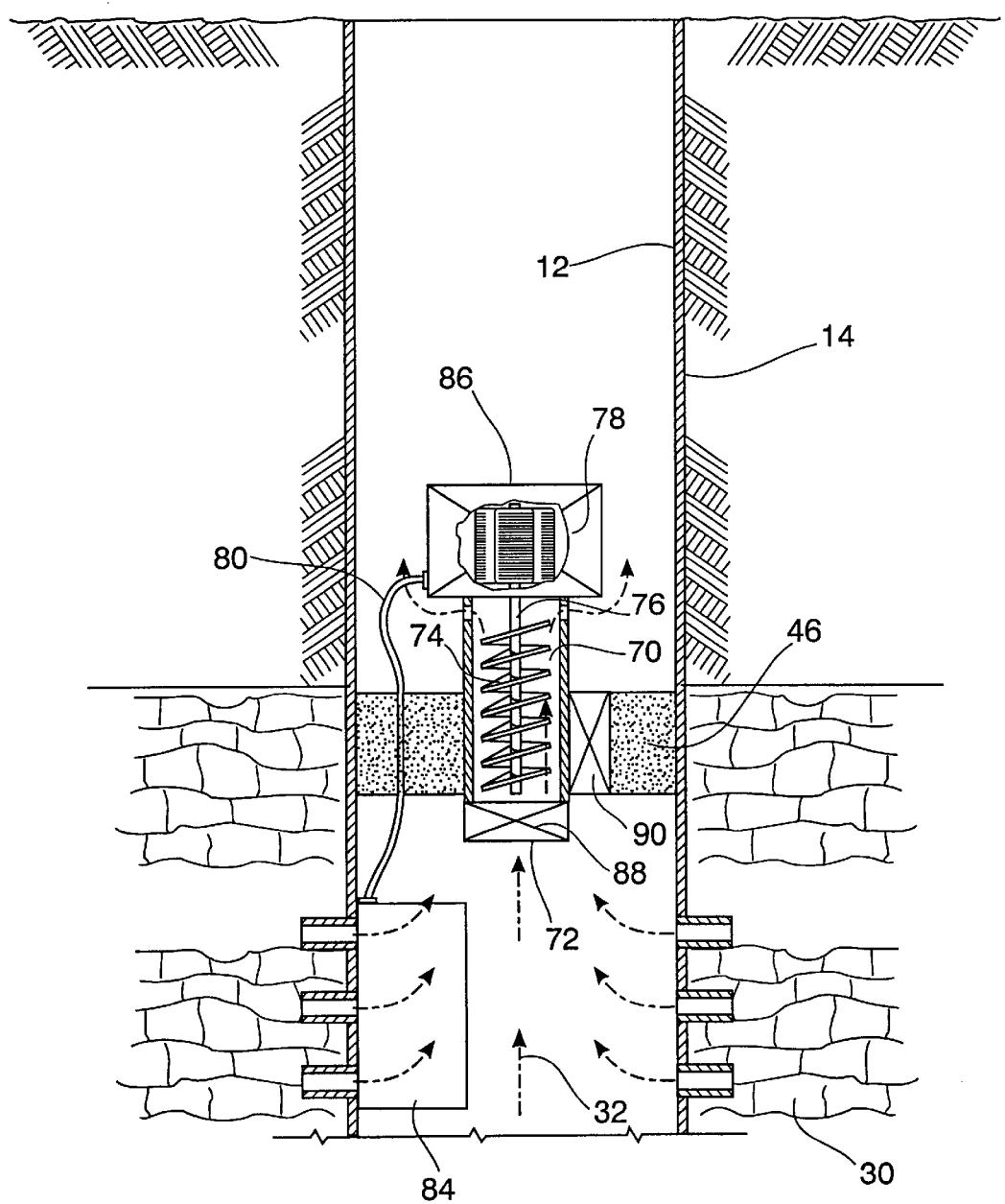
FIG. 4 is a cross sectional view of a subterranean well bore showing an alternate embodiment of an apparatus for utilization of the energy from flowing fluids using a turbine to produce electrical current to power a seismic source.

FIG. 4 illustrates yet another preferred embodiment of the present invention utilizing energy from flowing fluid illustrated by arrows 32 from a productive formation 30 to generate electricity to produce a seismic source. One such embodiment uses turbine 70 where flowing fluid 32 from the formation 30 passes through opening 72 of turbine 70. As fluid 32 passes into and through the turbine 70, the inner member 74 will be caused to rotate about its axis which in turn spins shaft 76 of a DC or AC generator 78 (shown in diagrammatic form) creating an electrical voltage and current. The electricity is transported via line 80. In particular, fluid 32 would enter end 72 and thereafter exit from end 86 of turbine 70. The electrical voltage/current 80 is transmitted by electrical connection to power seismic vibrator 84, which is discussed in greater detail below, can be a piezoelectric vibrator, electric motor with eccentric mass, a terfenol, a magneto restrictive material, or other mechanical means.

A further embodiment includes a control mechanism such as but not limited to a shut-off valve or other valving device 88 (shown in diagrammatic form) to shut off, restrict or control fluid flow through turbine 70. When the shut-off valve 88 is closed, fluid 32 will be prohibited from passing through turbine 70 and inner member 74 will cease its rotation.

The turbine 70 may also include a bypass shunt valve 90 (illustrated in diagrammatic form) which in the present embodiment is built into the packer element 46. A portion of the fluid flow 32 from the formation 30 could be diverted through the bypass mechanism. This bypass valve 90 could be active, therefore changing in response to the fluid flow 32 in the well bore 12, or it could be passive, such as a choke or other similar device.

Turbine with Eccentric Mass for Vibrator

Figure 5:
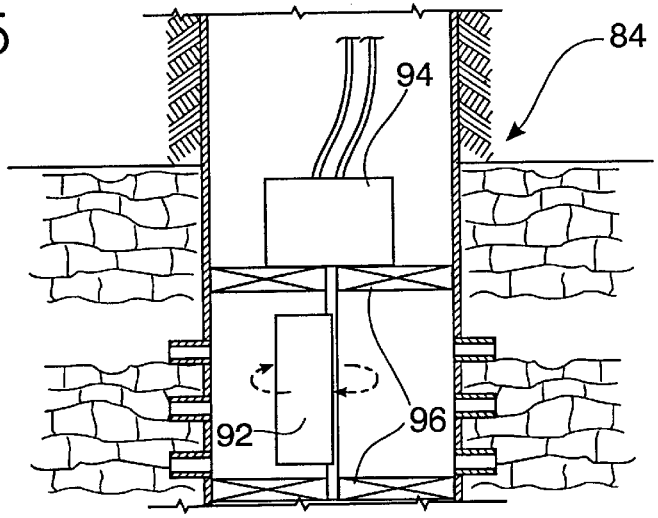
FIG. 5 is a cross sectional view of a subterranean well bore showing another alternate embodiment of an apparatus for utilization of the energy from flowing fluids using a turbine to create an electrical current to power a seismic source with an eccentric mass driven by an electrical motor.

FIG. 5 illustrates an embodiment of electrically driven vibrator 84 powered by the electric current 80 produced by turbine 70. An eccentric mass 92 is driven by electrical motor 94 (illustrated in diagrammatic form). Electric motor 94 rotates eccentric mass 92 held by a bearing assembly 96. The eccentric mass 92 creates a seismic vibration source as it spins at a known frequency rate.

Turbine with Piezoelectric Bender for Vibrator

Figure 6:
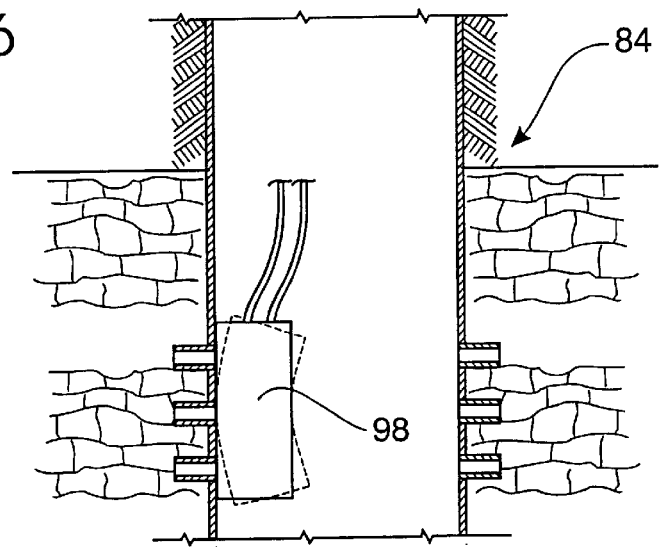
FIG. 6 is a cross sectional view of a subterranean well bore showing an alternate embodiment of an apparatus for utilization of the energy from flowing fluids using a turbine to create an electrical current to power a seismic source with a piezoelectric bender bar for creating a seismic source.

FIG. 6 illustrates another embodiment of electrically driven vibrator 84 powered by the electric current 80 produced by turbine 70. Piezoelectric bender bar 98 utilizes the electrical current 80 to bend causing vibration for a seismic source. The impact of the piezoelectric bender bar 98 causes a seismic source.

Turbine with Magneto Restrictive Material for Vibrator

Figure 7:
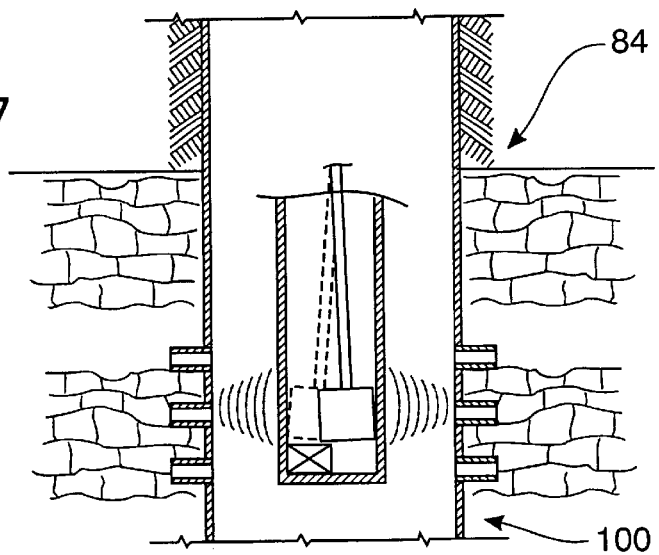
FIG. 7 is a cross sectional view of a subterranean well bore showing an alternate embodiment of an apparatus for utilization of the energy from flowing fluids using a turbine to create an electrical current to power a seismic source with a magneto restrictive material.

FIG. 7 illustrates yet another embodiment of electrically driven vibrator 84 powered by the electric current 80 produced by turbine 70 using a magneto restrictive material 100. The seismic vibrational signal is transmitted via fluid 32 to well bore 12.

Resonant Chamber Embodiment

Figure 8:
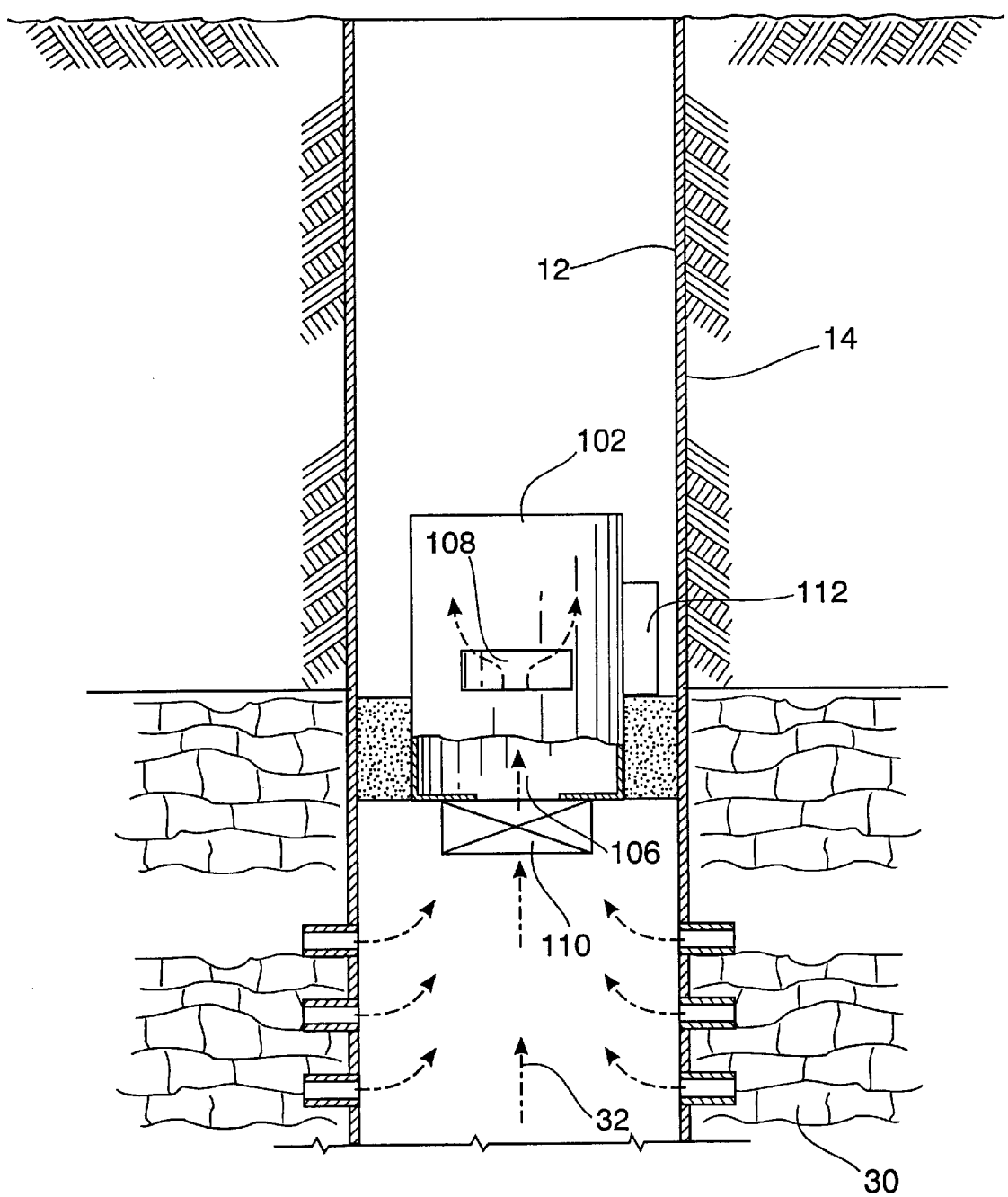
FIG. 8 is a cross sectional view of a subterranean well bore showing an alternate embodiment of an apparatus for utilization of the energy from flowing fluids to create a seismic source utilizing a resonant chamber.

FIG. 8 illustrates another preferred embodiment of the present invention utilizing energy from flowing fluid 32 from a productive formation 30. A resonant chamber 102 channels the pressurized fluid 32 through a passageway through chamber 102 creating a seismic noise/vibration such as an organ pipe or whistle. Pressurized fluid 32 travels through an opening 106 in the chamber 102 and passes through via a passageway through chamber 102 to an exit 108. The vibration is passed along to the well bore 12.

The resonant chamber 102 may include a shut-off valve 110 (illustrated in diagrammatic form) or other valving device to shut off, restrict or control fluid flow through resonant chamber 102. When the shut-off valve 110 is closed, fluid 32 will be prohibited from passing through the chamber 102 which will cease its seismic signal.

The resonant chamber 102 may also include a bypass shunt valve 112 (illustrated in diagrammatic form) which in the present embodiment is built into packer element 46. A portion of the fluid flow 32 from the formation 30 could be diverted through the bypass mechanism. This bypass valve 112 could be active, therefore changing in response to the fluid flow in the well bore, or it could be passive, such as a choke or other similar device.

Finally, a further embodiment of the invention might entail pumping fluids from the surface, such as water or other fluids back down the well bore. The force of the fluids moving back down the well bore creates an energy force that may be utilized as described above.

Whereas, the present invention has been described in relation to the drawings attached hereto, it should be understood that other and further modifications, apart from those shown or suggested herein, may be made within the spirit and scope of this invention.

What is claimed is:

1. A fluid powered downhole vibration tool used in a well bore having produced fluids under pressure, which tool comprises:
   a downhole turbine in fluid communication with said fluids under pressure;
   a fluid powered turbine motor in said well bore in communication with said turbine, wherein said motor generates electricity; and
   means to vibrate said well bore with said electricity produced by said motor.

2. A fluid powered downhole vibration tool as set forth in claim 1 wherein said means to vibrate said well bore with said electricity produced by said motor includes a seismic eccentric mass rotated in said well bore by said electricity, said seismic mass engaging said well bore causing vibration of said well bore.

3. A fluid powered downhole vibration tool as set forth in claim 2 wherein said means to vibrate further includes a bearing assembly coupled to said seismic eccentric mass.

4. A fluid powered downhole vibration tool as set forth in claim 1 wherein said means to vibrate said well bore with said electricity further includes a piezoelectric bender bar.

5. A fluid powered downhole vibration tool as set forth in claim 4 wherein said a piezoelectric bender bar is in communication with said well bore.

6. A fluid powered downhole vibration tool as set forth in claim 1 wherein said motor further includes a control mechanism to control flow of said fluids under pressure through said motor.

7. A fluid powered downhole vibration tool as set forth in claim 6 wherein said control mechanism further includes a shut-off valve to shut off fluid flow through said turbine.

8. A fluid powered downhole vibration tool as set forth in claim 6 wherein said control mechanism further includes a bypass shunt valve to divert a portion of said fluid away from said motor.

\* \* \* \* \*